United States Patent [19]
Good

[11] 3,936,565
[45] Feb. 3, 1976

[54] MOLDED PLASTIC ARTICLE AND METHOD

[75] Inventor: Elmer H. Good, Woodland Hills, Calif.

[73] Assignee: Hollowform, Inc., Woodland Hills, Calif.

[22] Filed: May 3, 1974

[21] Appl. No.: 466,622

[52] U.S. Cl. ............... 428/315; 264/45.4; 264/45.5; 264/45.7; 428/321; 428/322; 428/516; 428/520
[51] Int. Cl.² .......................................... B32B 3/26
[58] Field of Search.................. 161/160, 161, 183; 264/45.4, 45.7, 45.5, 46.5, 46.8; 428/71, 76, 310, 315, 321, 322, 516, 520

[56] References Cited
UNITED STATES PATENTS

| | | | |
|---|---|---|---|
| 3,317,363 | 5/1967 | Weber | 161/160 UX |
| 3,419,455 | 12/1968 | Roberts | 161/183 |
| 3,455,483 | 7/1969 | Inklaar | 161/160 |
| 3,541,192 | 11/1970 | Shapero et al. | 161/161 |
| 3,642,965 | 2/1972 | Nuttall et al. | 161/161 |
| 3,812,225 | 5/1974 | Hosoda et al. | 161/160 |

*Primary Examiner*—William J. Van Balen
*Attorney, Agent, or Firm*—Ellsworth R. Roston

[57] ABSTRACT

A rigid plastic article includes an outer skin surface of a polyolefin plastic material such as cross-linked high density polyethylene tightly secured to a foam core the latter preferably of a high density or medium density polyethylene. Such a laminated plastic article has substantial rigidity and strength, particularly flexural strength, the latter being greater for the laminate than the sum of the individual flexural strengths of the skin and foam separately. Due to the thermal and sound insulation, rigidity, flotation, impact resistance, relative lightweight and weatherability characteristics, the laminate offers particular advantages for use in complex shapes such as automotive doors and tops, camper tops, boats and recreational vehicles and containers such as water tanks, carboys and the like. Such products may be manufactured by a rotational molding procedure in which each of the plastic materials is sequentially introduced into a rotating heated mold. The first plastic material coats the mold surface and the second is sequentially released so that both plastics are fused together in a single cycle with the result that a strong natural bond is formed at the interface of the laminate thus contributing substantially to the overall strength of the resultant product. A third plastic material may be used to form a second surface skin. Typical materials are high, medium, low density polyethylene, cross-linked polyethylene, polycarbonates, and acrylic modified vinyl chloride plastics. The foam core is preferably of high or medium density linear polyethylene having a closed cell structure and a density of 12 to 20 pounds per cubic foot.

7 Claims, 8 Drawing Figures

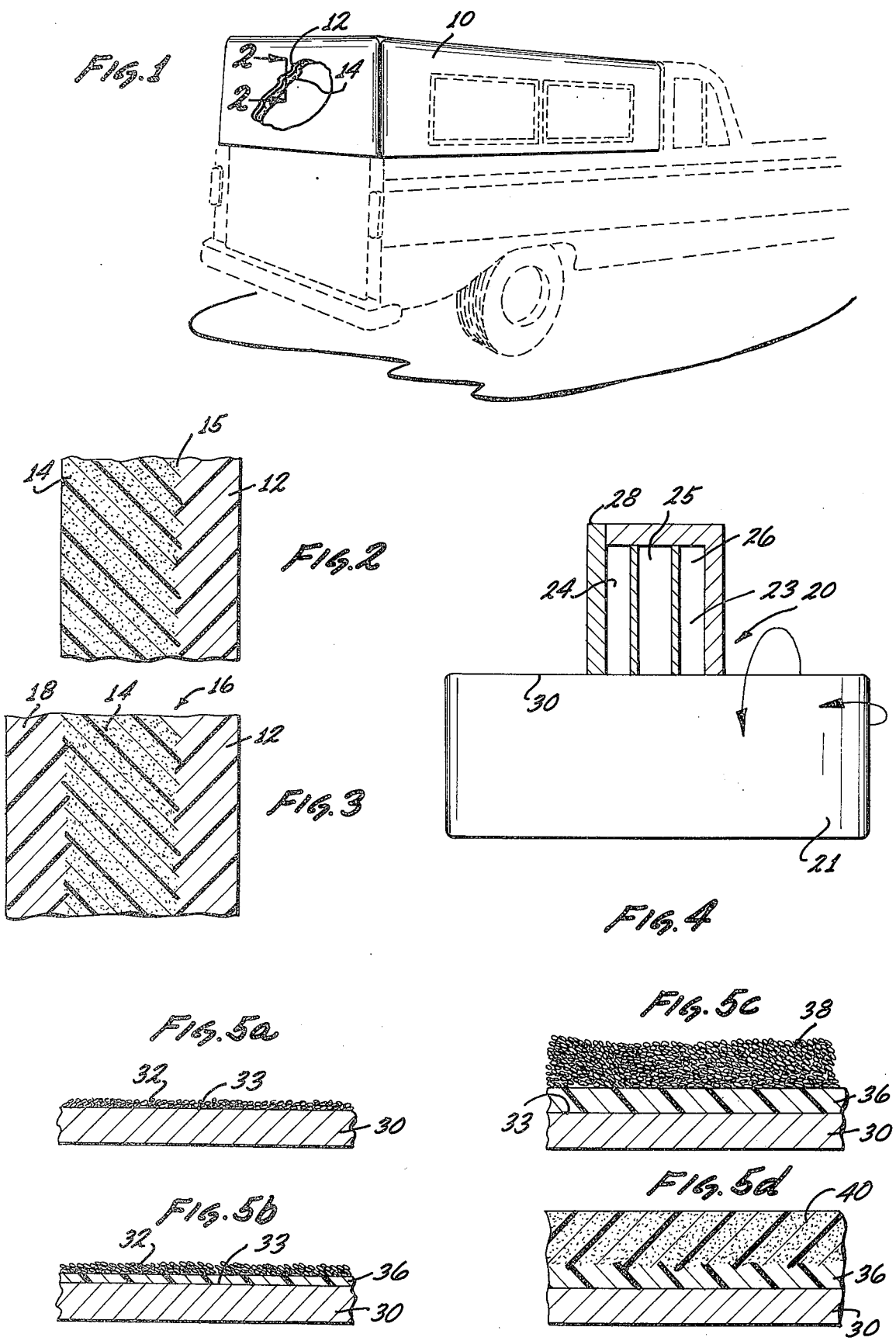

MOLDED PLASTIC ARTICLE AND METHOD

BACKGROUND OF THE INVENTION

Polyolefin plastic materials have been used to form plastic articles, especially polyolefin materials of the polyethylene type, that is, high density, medium density and low density materials. One of the difficulties which has been encountered with polyethylene plastic parts, especially those of complex shapes, is the relatively low flexural strength of polyethylene.

As is known, polyethylene is a partially crystalline and partially amorphous material, the side chain branching of the molecule being the factor which controls the degree of crystallinity. High density polyethylene has fewer side chains than low density polyethylene and accordingly a higher degree of crystallinity may be obtained. In general, increasing the crystallinity increases rigidity, tensile strength and hardness, and high molecular weight polyethylenes (those of low melt index) generally have better physical properties than the low molecular weight counterparts. Typical of the better physical properties are those such as impact resistance and stress crack resistance. However, the higher melt viscosity and the low melt index of the high molecular weight polyethylenes render them more difficult to process.

Low density polyethylenes generally are considered to have a density in the range of 0.90 to 0.925, while the high density material is generally regarded as having a density in the range of 0.941 to 0.965. For medium density polyethylene, the range is 0.926 to 0.940.

A particular material in the polyolefin family which deserves special comment is a material known as a cross-linked polyethylene which is thermosetting in its nature. In processing this type of material, a peroxide type cross-linking agent is generally used to affect the three dimensional branching network characteristic of cross-linked polyethylene.

In the case of large complex shapes used as structural members, it is frequently not possible to obtain all of the desirable physical characteristics by the use of a single polyolefin material. The difficulty which is encountered is that the use of two different types of polyethylene materials may provide the desired physical characteristics but there is considerable difficulty in providing a structural member formed of two separate plastic materials which has sufficient integrity to provide the overall desired physical characteristics, or in the alternative, the processing thereof becomes quite complicated and expensive.

By way of example, a cross-linked polyethylene material has a relatively low flexural modulus, about 100,000 psi. Normally, the processing includes starting with a high density material which, when cross-linked lowers the density of the material. For example one may start with a polyethylene having a density of 0.955 and when cross-linked the density is approximately 0.94 which is in the range of the lower end of the high density materials or the higher end of the medium density materials, or what is sometimes referred to as a medium density material.

Where high flexural strengths are needed, for example in structural components for the recreational market such as recreational vehicles and boats, the use of a cross-linked polyethylene material does not provide sufficient flexural strength.

It is also known that high density polyethylene foams are quite rigid, having a flexural modulus of between 200,000 and 300,000 psi. These particular materials, however, have a relatively low impact resistance in that a foamed product may be easily fractured. Thus, in those instances in which the plastic part is to be subjected to impact, for example, automotive doors and tops, camper tops, boats, carboys and containers, the use of a polyethylene foam which has an appreciable flexural modulus presents practical problems.

It is possible, separately to form two components and join them together by a bonding procedure. By way of example, polyethylene and polypropylene may be heat sealed, but generally require melting. Where a particular part is relatively large in size, such a boat, or a camper top or a top for a recreational vehicle, joining together two separately formed plastic elements by an adhesive or by any of the conventional bonding methods used in the plastics industry is not acceptable from the standpoint of the result produced and the substantial expense necessary to handle large bulky items of complex shapes.

Nonetheless, the potential strengths obtained from polyolefin plastic materials, and perhaps other thermal plastic materials as well as thermosetting materials renders them attractive candidates for the formation of structural parts provided the structural part has sufficient integrity to remain tightly adhered such that the strengths of the resulting product are sufficiently high for the intended use. Accordingly, it is desirable to provide a plastic article having the desirable features of rigidity, thermal and sound insulation, flotation, impact resistance, relative lightweight, and weatherability. Moreover, it is desirable to be able to fabricate complex shapes so as to provide a bond between the respective components of the plastic article which assures the maximum utilization of the strengths of the individual components making up the plastic article. Particularly advantageous is a method by which an article may be formed in one operation such that separate processing of separate parts followed by a step of adhering the two together is eliminated.

Typical of the prior art patents are U.S. Pat. Nos. 3,649,407; 3,748,214; 3,655,497; 3,673,033; 3,705,071; 3,458,380; 3,472,715; 3,715,256; 2,341,260; 3,709,966; 3,607,600; 3,193,437; 3,228,819; and 3,709,967.

SUMMARY OF THE INVENTION

This invention relates to an improved plastic structure and a method of forming the same, and more particularly to an improved plastic structure having significant strength characteristics and formed of an outer skin and a rigid foam core wherein the foam and skin are formed in one molding or forming operation followed by fusion of the two in a single cycle to provide a tightly adherent laminate which has significant and unexpected strength properties.

In accordance with the present invention, a plastic article of relatively complex shape is provided of an intimately secured laminate including an outer skin surface and a rigid foam core. The outer skin surface is tightly secured to the foam along the entire interface, to provide a laminate having substantial rigidity and strength, particularly flexural strength. Typical of the materials which may be used to form the outer skin surface are polyolefin materials especially polyethylene materials of the low, medium density and high density types and cross-linked types. The foam core, is preferably a closed cell foam having a density of between 8 and 20 pounds per cubic foot, with a maximum of the cells in the foam being closed, for example 90 percent to 97 percent. This type foam offers the advantages of buoyancy, and especially good thermal and acoustic insulation properties as well as rigidity.

Optionally, a second skin member may be used with the laminate described in order to increase substantially the structural strength characteristics of the product.

In a preferred form, the foam core is a linear high density or medium density polyethylene foam, the polyethylene material having a density of at least about 0.960. The skin surface is preferably a cross-linked polyethylene material initially having a density of 0.95 or higher, and cross-linked to provide a resultant medium density outer skin having a density of approximately 0.94. Where a cross-linked outer skin is used in combination with a high density linear foam, it has been observed that the resultant product has a flexural strength of approximately 500,000 psi whereas the skin alone has a flexural strength of 100,000 psi while the foam alone has a flexural strength in the range of 200,000 to 300,000 psi. Thus, by fabricating the structure in the manner hereinafter described, the flexural strength of the resultant product is greater than the sum of the individual flexural strengths of the components making up the laminate, an entirely unexpected but desirable feature.

One of the principal features of the structural plastic article of the present invention is the nature of the bond between the outer skin surface and the foam core. Where a cross-linked material is used as one of the skin members in contact with the foam, the bond between the foam and the cross-linked material, at the interface between the two, is believed to be a cross-linked interface in which the plastic material of the foam is cross-linked into the cross-linked skin so as to form an intimately secured laminate of one plastic material in contact with another. It is in part, by virtue of this tightly adherent bond at the interface that the structural strengths herein described are achieved.

In its broader aspects, the present invention also involves an improved procedure for forming complex shapes of considerable structural strength by a rotational molding procedure in which at least two plastic materials are deposited on the mold wall and simultaneously fused together in one heating cycle so as to form a secure bond between the two plastic materials making up the laminate without the use of any separate adhesive, or any of the conventional separate adhering operations heretofore used in the prior art. Thus, in one molding cycle, at least two plastic materials are formed into a single integrated laminated structure having a tightly secured and adherent interface which prevents delamination of the component plastic parts making up the laminate.

Typical materials which may be used for the foam core are materials such as high density, medium density and low density polyethylene, or polycarbonate materials. The skin members may be made of high density, medium density, low density, and cross-linked polyethylene or materials such as acrylic modified vinyl chloride polymers.

It will be apparent to those skilled in the art that the plastic article and method of the present invention are not considered to be limited to the specific constructions and methods as herein described and illustrated. Rather, the specific articles and methods shown and described herein are illustrative of a preferred form of the present invention, and other modifications and embodiments will become apparent to those skilled in the art upon reading the following detailed description.

BRIEF DESCRIPTION OF THE DRAWINGS

FIG. 1 is a view in perspective of a plastic article constructed in accordance with the present invention;

FIG. 2 is an enlarged fragmentary section taken along the lines 2—2 of FIG. 1 showing the laminated plastic member and the bond therebetween;

FIG. 3 is a sectional view of a laminate including a foam core with skin members on each surface thereof in accordance with the present invention;

FIG. 4 is a diagrammatic view of a mold assembly for use in rotational molding in accordance with the present invention; and FIG. 5a—5d inclusive are diagrammatic views illustrating the condition of the plastic material within the mold at various stages during the rotational molding procedure in accordance with the present invention.

DETAILED DESCRIPTION

Referring to the drawings which illustrate an exemplary form of a preferred embodiment of the present invention, FIG. 1 shows a plastic article generally designated 10 of a relatively complex shape. The particular structure 10 illustrated in FIG. 1 is a camper top, however it is understood that other complex shapes may be formed, as heretofore described.

The plastic articles of this invention are characterized by highly desirable properties which enable the plastic articles to be used as structural components. For example, thermal and sound insulation, rigidity, flotation, impact resistance, relative lightweight, and weatherability are properties which are achieved by virtue of the article constructed in accordance with the present invention.

Again referring to FIG. 1, the plastic article includes an outer skin member 12 which forms an exposed outer surface of the article 10. The outer surface skin member is fluid impermeable and is preferably formed of a polyolefin plastic material. In a preferred form, as illustrated in FIG. 1, the outer skin member 12 is preferably a cross-linked polyethylene polymer in which the polymer before cross-linking is a high density material, having a density of at least 0.955. When a high density polyethylene material of this type is cross-linked, the result is a medium density cross-linked polyethylene material which possesses thermosetting qualities.

Typically, a cross-linked high density polyethylene material has a flexural modulus of approximately 100,000 psi, a tensile strength of between 2500 and 2700 psi, and a density of between 0.930 and 0.945. It is the relatively low flexural modulus which creates difficulty in providing plastic parts having sufficient rigidity and structural integrity to be used as structural plastic parts.

In the form illustrated in FIG. 1, the cross-sectional dimension of the skin member 12 may vary from a few mils thickness to ⅜ of an inch or more, depending upon the structural loads to be imposed on the laminate.

To provide the rigidity, thermal and sound insulation qualities, flotation and to increase the flexural strength and the impact resistance, the plastic structural member 10 includes a foam core 14. The foam core is preferably a foamed polyolefin such as high density, medium density or low density polyethylene. In the preferred form illustrated in FIG. 1, the foam member is a closed cell foam of a linear high density polyethylene wherein the polyethylene has a density of at least 0.960, the foam being of a density of between 12 to 20 pounds per cubic foot. The foam itself contains a substantially significant percentage of closed cells, that is, at least 90 percent of the cells are closed, and preferably at least 97 percent of the cells are closed.

The foam core 14, if it did not include the outer skin member 12, would be a rigid product of relatively high flexural modulus, for example between 200,000 and 300,000 psi. However, the impact resistance of such a foam core, per se, is relatively low.

By forming both the skin and core members 12 and 14, respectively, in the assemblage described and by the procedures hereinafter described, the skin member 12 operates to increase substantially the impact resistance of the foam core while the latter operates to increase substantially the flexural modulus of the laminated plastic member 10. By way of example, the flexural modulus of the structure described in connection with FIG. 1 is approximately 500,000 psi, a flexural modulus which is greater than the sum of the individual moduli of the respective separate parts forming the laminate.

Referring to FIG. 2, wherein like reference numerals have been used where applicable, it will be seen that an interface 15 exists between the outer skin member 12 and the foam core 14. This interface forms an unexpectedly strong bond between the outer skin member and the foam core member. Where a cross-linked polyethylene is used as the outer skin member, and a high density polyethylene is used to form the foam core, the interface is believed to be composed of a cross-linked interface in the sense that a portion of the cross-linking agent used to cure the outer skin member 12 also affects cross-linking of a portion of the foam core to the outer skin member 12 thereby providing a bond between the two materials which is of unexpectedly high strength.

The strength of this bond may be demonstrated by the fact that when produced as hereinafter described, the core 14 is tightly adhered over its entire outer exposed surface to the facing skin member 12. Due to the tight bond between the two components of the plastic structure, impacts from the exposed inner surface of the foam do not result in destruction of the laminate, or puncture or fracture thereof. On the other hand, the outer skin member 12 has considerable impact resistance because of the structural strength of the polyethylene plastic, even though the polyethylene skin per se does not have a high flexural modulus. The synergism resulting from the assemblage of the two provides the optimum qualities of both impact resistance and high flexural modulus, qualities which are present in one or the other of the components making up the laminate, but not to the extent necessary to provide the high strength of the laminated product.

It is also possible in accordance with the present invention to utilize a polycarbonate resin as the foam core and a high density, low density, medium or cross-linked density polyethylene as the outer skin, since polycarbonate plastic is compatable with polyethylene resin and a tight bond may be obtained at the interface when the parts are processed as herein described. It is also possible to use a low density, medium density, or high density or cross-linked polyethylene for the outer skin, or an acrylic modified vinyl chloride polymer, the latter sometimes being compatable with the plastic material used to form the foam core.

In certain structural members, it is desirable to protect both the inner and outer exposed surfaces of the foam core. Referring to FIG. 3, a plastic article 16 is shown which includes an outer skin member 12 of the type described, an inner foam core 14 of the type described, and an inner skin member 18. The inner skin member may be of high density, medium density, low density, or cross-linked polyethylene, or acrylic modified vinyl chloride co-polymer as mentioned, or other thermoplastic materials. The advantage of a structure as illustrated in FIG. 3 is that the foam core 14 is protected on each side from impact. It will be understood, that skins 12 and 18 may be of the same or different materials, and may be the same or different dimensions depending upon the structural characteristics desired in the final product.

Of significance is the fact that whether a dual skin arrangement is provided, or a single skin arrangement, the plastic article includes a rigid foam core of the type described which provides the thermal and sound insulation, rigidity and flotation.

By way of example, a kayak type of canoe was fabricated from the plastic product of the present invention, in accordance with the preferred form, and navigated in white water which includes a substantial number of partially submerged rocks and boulders. The performance of the kayak was exceptional in that none of the repeated hits against the submerged rocks caused damage to the outer skin surface. A comparable test with a kayak made of fiberglass reinforced plastic resulted in several punctures which required repair. Also by way of example, a row boat was fabricated in accordance with the preferred form and dropped in a free fall from a distance of 50 feet vertically to a concrete pavement. The free fall drop produced no noticeable damage with respect to the craft.

One of the features of the present invention relates to the process of fabrication of the plastic article above described, a procedure which is believed, in part, attributable to the substantial and unexpected strength characteristics of the resulting product.

Referring to FIG. 4, a rotational molding assembly 20 is shown in diagrammatic form. The assembly 20 includes a mold element 21 having a predetermined internal configuration which corresponds to the configuration of the article desired. The mold assembly 20 is rotated on two axes, indicated by the arrows, at predetermined speed ratios. The general art of rotational molding is well known to those skilled in the art.

Mounted on the mold is a dispenser assembly 23 divided into multiple compartments 24, 25, and 26, although two compartments may be used if only two different plastic materials are to be formed into a laminate. The dispenser 23 is completely insulated thermally by insulation material 28. The dispenser 23 is mounted above an opening 30 in the mold 21.

During a rotational molding operation, the entire mold assembly 20 is preferably introduced into an oven while it is being rotated in the two axes at predetermined speed ratios. In a typical example, the oven is operated at a temperature of approximately 575°F ± 200°F.

Prior to introducing the mold assembly 20 into the oven, an appropriate charge of plastic material is introduced into the mold cavity and an appropriate charge is introduced into the dispenser. The amount of plastic material placed in the mold and the dispenser is sufficient to provide a desired cross-sectional dimension of the various portions of the plastic laminate.

After introduction of the mold assembly into the heated oven, the latter is rotated about the two axes while the mold assembly is heated. The relative predetermined speed ratios may be varied in accordance with the particular mold design to assure the proper rotational motion and plastic distribution as is well known in the art.

While positioned within the oven and exposed to the heated air of the oven, and while the mold assembly is rotated as described, the following takes place. As is known in the art, the plastic materials in the dispenser normally are particulate, in the sense that it is a powdery material or, in the alternative as is well known in the art a plastisol type material may be used, which for the purposes of this invention is likewise considered to be a particulate material. During the rotation of the mold assembly, with the first charge of plastic material in the interior of the mold, the particles initially adhere to the heated mold surface, and thereafter coalesce into a continuous skin element which follows the contour of the interior of the mold. Thereafter, and in sequence and while the mold assembly is still within the heated oven the second charge of plastic is introduced into the interior of the mold, and the rotation continued until the second material coalesces over the first. In the event that a third charge is used, the third charge is thereafter sequentially released to form the inner skin element.

Following the coalescence of the third charge, the processing is complete in the sense that the mold is then withdrawn from the oven, allowed to cool and the formed product is thereafter removed from the mold.

To understand precisely what occurs within the mold so that the nature of the bond between the foam core and the outer skin may be understood more clearly, reference is made to FIGS. 5a through 5d.

Referring specifically to FIG. 5a, a portion of the mold wall 30 is illustrated having deposited thereon particles 32 of the first resin or plastic placed in the interior of the mold. Since the source of heat is external to the mold wall, the heat gradually transfers through the mold wall to the interior surface 33 thereof. As the interior surface reaches a temperature which is sufficient to heat and soften the plastic particles being tumbled throughout the interior of the mold, the plastic particles initially attach themselves to the mold wall in a substantially uniform manner throughout the entire interior surface portion of the mold. As sufficient heat is transferred to the individual particles, the particles 32 tend to become attached to the mold wall 33 and gradually coalesce into a continuous skin, the cross-sectional dimension of the skin being determined by the amount of particulate plastic material initially placed in the interior of the mold.

For purposes of explanation, and referring to FIG. 5b, a point is reached during the processing of the first introduced plastic material in which a continuous skin 36 is formed on the interior wall 33 of the mold, and an assemblage of particles 32 is adhered to the continuous skin 36 but not yet coalesced since the heat transfer through the mold wall and the skin is a progressive transmission of heat. The inside surface 33 of the mold may reach a temperature of anywhere from 275°F to 750°F depending upon the transfer of heat through the mold wall, and the type of plastic material being used, the former being a function of the cross-sectional dimension of the mold wall and the temperature of the environment surrounding the mold, all factors which are well known to those skilled in the art.

In a preferred form of the present invention, the material used for the outer skin 12, the plastic first placed in the interior of the mold is a cross-linked high density polyethylene in which a cross-linking agent such as dicumyl peroxide is used as the cross-linking agent. This plastic material is preferably precompounded before introduced into the mold 30. By way of example, the basic plastic may be compounded with anti-oxidants, a cross-linking agent, colorants and whatever other additives are needed to provide weatherability and the like, as is known in the art.

Once placed in the mold, while the latter is being exposed to heat and rotated, the plastic is evenly distributed throughout the interior mold surface and progressively formed into a skin of predetermined cross-sectional dimension depending upon the amount of material which is introduced into the mold and the surface area of the mold.

In the case of a cross-linkable polyethylene, a preferred material for the outer skin 12, in accordance with the present invention, the cross-linking begins to start at approximately 300°F. Thus, in order to achieve the strong structural bond with the foam core, the second plastic material is introduced into the interior of the mold prior to the completion of the cross-linking of the uppermost strata of the first deposited plastic material. Accordingly, at an appropriate moment prior to the complete cross-linking of the first plastic material, but after the start of the cross-linking process, the second charge of plastic material is dispensed into the mold while the latter still remains within the heated environment and while the mold is being rotated as described.

Referring to FIG. 5c, and by way of explanation, the interior surface 33 of the mold wall 30 is now substantially completely covered with a substantially uniform skin 36 of cross-linkable polyethylene. As a result of dispensing the second charge of plastic, particles 38 of the second charge are now evenly distributed over the coated mold surface and come into contact with the exposed partially cross-linked polyethylene, and are in turn heated and become attached to the cross-linkable skin 36. As sufficient heat is transferred through the mold wall, through the cross-linkable media 36 to the interior exposed surface, the second charge progressively adheres to the inner exposed material, and as the temperature thereof increases, the second charge likewise coalesces to form a substantially uniform film on the entire inner surface of the first formed plastic skin.

In the preferred form of the present invention, the second plastic material is precompounded from a high density linear polyethylene which includes between approximately ½ and 1 and ½ percent by weight of a celogen i.e. a blowing agent capable of providing a cellular foam structure having a closed cell arrangement.

Initially, the particles 38 of the second dispensed plastic material are coalesced to form a continuous layer, and thereafter, as the temperature is increased to approximately 350°F, the blowing agent is actuated to provide the closed cell structure described.

As will be apparent, the density of the foam may be varied by varying the amount of blowing agent, and the time and temperatures used during the processing during the rotational molding operation. Prior to degradation of the foamed plastic, the mold and its contents are removed from the oven, and the interior thereof is coated with a first layer 36 corresponding to the outer skin 12 and an interior foam core 40 corresponding to the foam component 14 previously described. As will be apparent from the foregoing description, the interface 15 is formed by the sequential dispensing of the second charge into the interior of the mold prior to the complete cross-linking of the first charge.

Im similar fashion, if a second skin member or a second foam layer is described, a third charge may be introduced into the interior of the mold, and the mold continued to be rotated and exposed to heat to form a skin member or a second foam layer on the exposed inner surface of the foam member.

It will be apparent from the foregoing description that the rotational molding procedure described involves sequentially depositing preformulated plastic materials at selected time intervals into a mold which is being rotated and heated. Thus, the bond formed between the two separate plastic charges is formed during a single processing operation, that is, the successive layers of different plastic materials are cured and fused in a single cycle. The result is a substantially stronger bond and a more uniform bond than may be accomplished, the case of complex shapes, by separately forming the individual components and thereafter heating the same to form a bond therebetween, or by applying an adhesive therebetween.

As previously noted, where a cross-linkable material is used, the bond at the interface between the foam and the cross-linkable material, be there one skin or two skins, is a cross-linked bond in which there is a cross-link interface forming the boundary between the separate plastic materials. In accordance with this invention, a cross-linked interface is a preferred form because of the substantial and unexpected strength of the bond and the resultant structure.

It is to be understood, however, that there are singular advantages in processing a plurality of plastic materials in a single cycle in that the processing of compatable plastics results in a bond between the two, along the interface, which is of substantial strength even though the materials may not be cross-linked materials. By way of example, the skin member 12 may be a medium density polyethylene, the foam may be polycarbonate, in which event a fusion bond exists at the interface, the fusion bond being formed during the single cycle processing. Thus, if a second skin member is to be formed, for example of low density polyethylene on the interior surface of a polycarbonate foam, the bond at this interface is likewise a fusion type bond formed during a single processing cycle. Thus, in one cycle, a multiple layered laminate may be formed to a precise configuration as determined by the predetermined contour of the mold, the resulting article having a fusion bond or a cross-link bond formed at one or more of the interfaces which has substantial strength and inhibits delamination of the separate plastic parts making up the laminated composite plastic structure.

As will be apparent, the second skin or second foam member 18 may be a high, medium or low density polyethylene, while the foam core 14 is the linear high density polyethylene material described and the outer skin member 12 being the cross-linked material described. Such a structure has substantial strength, and offers singular advantages with respect to those plastic products which must be resistant to impact, fairly rigid, bouyant, thermally and acoustically insulating, lightweight and weatherable. This combination of properties and the resulting product is produced by an improved and simple method which provides a strong bond between the plastic materials forming the laminate.

It is within the scope of the present invention to use a remote control system for controlling the dispensing of charges into the mold for formation of skin and foam layers. For example, a multichannel digital or analog proportional radio control system may be used. Such a system offers the advantage of minimum wiring and accurate control of the sequence of operations since, for example, a seven channel set could provide as many as 14 functions.

Accordingly, the method and article herein described offer advantages over those methods and articles known in the prior art.

While the above description and accompanying drawings illustrate an exemplary embodiment of the preferred form of this invention, it will be understood by those skilled in the art that changes and modifications may be made to the article and methods herein described and illustrated without departing from the scope of the invention as set forth in the appended claims.

I claim:

1. A foamed lightweight plastic structure having the properties of rigidity, thermal and acoustic insulation, impact resistance and buoyancy comprising a rigid foam core of high density polyethylene, said foam having a density of between 8 and 20 pounds per cubic foot, said foam being a closed foam in which at least 90% of the cells are closed, said polyethylene having a density of at least 0.960, said foam core having affixed thereto at least one skin member, said skin member being a cross-linked polyethylene having a density in the cured condition of at least 0.94, said skin member being affixed to said core by a bond characterized by the absence of applied adhesive and being the adherent joint formed by curing said cross-linked polyethylene in contact with said foam core, and the flexural strength of said foam core and affixed skin being greater than the flexural strengths of said foam core and said skin member.

2. A foamed plastic structure as set forth in claim 1 wherein said foam core has a second skin member affixed thereto on a surface thereof opposite the surface on which said one skin member is affixed.

3. A foamed plastic structure as set forth in claim 1 wherein said structure includes an inner and outer surface, and said skin member forming the outer surface.

4. A foamed plastic structure as set forth in claim 2 wherein said one skin member forms one exposed surface of said product and said second skin member forms another exposed surface thereof.

5. A foamed plastic product as set forth in claim 1 wherein said foam core has a second skin member intimately secured thereto, said second skin member being a polyethylene plastic polymer, and said one skin and said second skin forming the exposed surface portions of said foamed plastic product.

6. A foamed plastic structure as set forth in claim 1 wherein said foam core has a second skin secured thereto on a side thereof opposite said one skin, said second skin forming a second exposed surface and being selected from the group consisting of low, medium and high density polyolefin polymer and an acrylic modified vinyl chloride polymer, and said second skin being secured to said foam core by a bond which is characterized by the natural adherence of one plastic member cured in contact with another plastic member.

7. A foamed plastic product as set forth in claim 6 wherein said second skin is a low density polyethylene plastic.

* * * * *